(12) United States Patent
Gerder

(10) Patent No.: US 7,922,388 B2
(45) Date of Patent: Apr. 12, 2011

(54) DETECTION DEVICE AND PROCESS FOR DETECTING A TEMPERATURE OF AN OBJECT

(75) Inventor: Henning Gerder, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 435 days.

(21) Appl. No.: 12/030,367

(22) Filed: Feb. 13, 2008

(65) Prior Publication Data

US 2008/0273573 A1 Nov. 6, 2008

(30) Foreign Application Priority Data

May 4, 2007 (DE) .......................... 10 2007 020 941

(51) Int. Cl.
*G01K 7/00* (2006.01)

(52) U.S. Cl. ........ 374/164; 374/166; 374/185; 374/112; 600/549

(58) Field of Classification Search ................. 374/164, 374/166, 185, 112; 600/549
See application file for complete search history.

(56) References Cited

U.S. PATENT DOCUMENTS

| | | | |
|---|---|---|---|
| 4,158,965 A | 6/1979 | Prosky | |
| 6,146,015 A | 11/2000 | Weiss | |
| 6,827,487 B2 * | 12/2004 | Baumbach | 374/164 |
| 7,597,668 B2 * | 10/2009 | Yarden | 600/549 |
| 2002/0035340 A1 | 3/2002 | Fraden et al. | |
| 2002/0191675 A1 | 12/2002 | Tokita et al. | |
| 2003/0032893 A1 | 2/2003 | Koch | |

FOREIGN PATENT DOCUMENTS

| | | |
|---|---|---|
| DE | 3048192 C1 | 8/1982 |
| DE | 3527942 A1 | 2/1987 |
| DE | 20002615 U1 | 5/2000 |
| DE | 10038247 A1 | 5/2001 |
| DE | 102005037921 B3 | 6/2006 |
| DE | 102005004933 B3 | 8/2006 |
| DE | 102006012338 B | 7/2007 |
| DE | 102007002369 B | 5/2008 |
| GB | 2429060 A | 2/2007 |
| JP | 60036925 A | 2/1985 |
| JP | 61133827 A | 6/1986 |
| WO | WO 2004/041321 A2 | 5/2004 |

* cited by examiner

*Primary Examiner* — Lisa M Caputo
*Assistant Examiner* — Mirellys Jagan
(74) *Attorney, Agent, or Firm* — McGlew & Tuttle, P.C.

(57) ABSTRACT

A detection device is provided for detecting a temperature of an object, especially of a living being. The detection device may be connected to at least one temperature sensor and is designed to send a current for detecting the temperature to the temperature sensor and to receive at least one temperature signal, which represents a temperature of the temperature sensor. The detection device is designed to generate a temperature signal, which represents the temperature of the object, as a function of the temperature signal of the temperature sensor, and to send same on the output side. The detection device is designed to generate a heating current and to send the heating current to the temperature sensor during a heating time period, so that a total current, comprising the current for detecting the temperature and the heating current, is greater than the current for detecting the temperature, and thus to heat the temperature sensor.

21 Claims, 7 Drawing Sheets

DETECTION DEVICE AND PROCESS FOR DETECTING A TEMPERATURE OF AN OBJECT

CROSS REFERENCE TO RELATED APPLICATIONS

This application claims the benefit of priority under 35 U.S.C. §119 of German Patent Application DE 10 2007 020 941.1 filed May 4, 2007, the entire contents of which are incorporated herein by reference.

FIELD OF THE INVENTION

The present invention pertains to a detection device for detecting the temperature of an object, especially a living being. The detection device may be connected to at least one temperature sensor and is designed to send a current for detecting a temperature to the temperature sensor and to receive at least one temperature signal, which represents a temperature of the temperature sensor. The detection device is designed to generate a temperature signal, which represents the temperature of the object, as a function of the temperature signal of the temperature sensor and to send that signal on the output side.

BACKGROUND OF THE INVENTION

The problem encountered in detection devices known from the state of the art for detecting a temperature, especially the temperature of a living being, is that the heat flux through the temperature sensor reaches a constant value after up to 20 minutes, so that the temperature sensor has, with a sufficient accuracy, the same temperature as the temperature of the object to be detected.

A device for detecting a body temperature of a living being is known from DE 10 2005 004933. The device is designed to detect a temperature difference of a first temperature sensor and a second temperature sensor and to take into account a heat loss current developing during a measuring operation by means of a compensating unit.

SUMMARY OF THE INVENTION

The basic object of the present invention is to provide a detection device for detecting a temperature of an object, which makes it possible to detect a temperature of the object more rapidly. This object is accomplished by a detection device of the type described in the introduction, the detection device being designed to generate a heating current and to send the heating current to the temperature sensor during a heating time period, so that a total current, comprising the current for detecting the temperature and the heating current, is greater than the current for detecting the temperature, and thus to heat the temperature sensor.

The temperature sensor can be advantageously brought by the heating current into a temperature range in which an object temperature shall be detected. A constant heat flux through the temperature sensor and stable heat conditions can be set more rapidly as a result in a likewise advantageous manner. The total current through the temperature sensor is increased by the heating current.

The detection of the temperature or the measurement of a temperature may preferably take place after the end of the heating time period. The heating current is preferably greater than the current for detecting the temperature by a factor of 10 and more preferably by a factor of 100.

In a preferred embodiment, the temperature sensor is a double temperature sensor, which comprises a first temperature sensor and a second temperature sensor and a heat transmission member with a predetermined heat transmission resistance, which is arranged between the first temperature sensor and the second temperature sensor. The heat transmission member may be formed by a heat insulator, for example, a plastic. The detection device is designed to determine the temperature of the object as a function of a first temperature signal generated by the first temperature sensor and as a function of a second temperature signal generated by the second temperature sensor and to send the heating current to the first and/or second temperature sensor during the heating time period and thus to heat it. The temperature of the object, especially that of a living being, for example, of a human being, can be accurately detected by the double temperature sensor. The heat transmission layer preferably has a predetermined thermal conductivity. As a result, a temperature difference can become established between the first temperature sensor and the second temperature sensor.

The detection device is likewise preferably designed to determine the temperature of the object as a function of a first temperature signal generated by the first temperature sensor and as a function of a second temperature signal generated by the second temperature sensor according to a predetermined assignment rule. The predetermined assignment rule is, for example, as follows:

$$T_0 = T_1 + K_s/K_g * (T_1 - T_2),$$

in which
$T_0$=object temperature;
$T_1$=temperature of the first temperature sensor, in contact with the object;
$T_2$=temperature of the second temperature sensor, in contact with an environment;
$K_s$=thermal conductivity of the temperature sensor;
$K_g$=thermal conductivity of the object, especially human tissue.

In a preferred embodiment, the detection device is designed to detect a temperature rise over time represented by the temperature signal and to send the heating current to the temperature sensor as a function of the temperature rise. Energy can be advantageously saved by heating as a function of the temperature rise, as a trigger for activating the heating current, because the temperature sensor is heated only after contacting the object.

In a preferred embodiment, the detection device is designed to receive a first temperature signal of a first temperature sensor and a second temperature signal of a second temperature sensor. The detection device is designed, furthermore, to generate a difference between the first temperature signal and the second temperature signal and to send the heating current to the first and/or second temperature sensor as a function of the difference. As a result, a double temperature sensor can be advantageously connected to the detection device, and the first temperature sensor and the second temperature sensor are thermally connected to one another, for example, by means of a heat transmission member, especially an insulator. When the first temperature sensor and the second temperature sensor are in an environment, for example, air, an ambient temperature is detected by both temperature sensors and a corresponding temperature signal is generated. When one of the temperature sensors is brought into contact with the object, especially a human being, a temperature rise is detected by this sensor. The second temperature sensor is located at least partly in the environment and is connected to the object only indirectly, namely, via the heat transmission member and the first temperature sensor. The difference between the first temperature signal and the second temperature signal can thus be used as a trigger for activating the heating current. As a result, energy can be advantageously saved by the temperature sensor being heated, only after contacting an object.

In an advantageous embodiment variant, the detection device is designed to generate the heating current during the heating time period such that the heating period comprises heating periods and heating pause periods. The detection device is designed, in a likewise advantageous manner, to detect and/or analyze the temperature signal during a heating pause period. No separate heating current is generated during a heating pause period. Heating of the temperature sensor by means of time periods can be advantageously implemented technically efficiently, for example, by means of a pulse width modulation. In a likewise advantageous manner, the temperature signal can be detected or additionally analyzed during a heating pause period. Heating of the temperature sensor can advantageously take place by means of a pulse width modulation such that heating periods, which have different heating period durations from one another, are formed to set a heat output. The detection device may have for this a pulse width modulator, which is designed to set a heat output such that the heating current is generated during the heating time period, preferably to set a heat output with a settable heating period duration. The detection device may be designed in another embodiment to generate heating periods of equal heating period duration, in which case the detection device can set a heat output such that it is possible to set a density over time of consecutive, generated heating periods. Thus, a heat output is set in this embodiment by changing the period duration of the heating pause periods.

The heating time period can be preferably predetermined. The detection device may preferably have for this purpose a memory for heating time periods. Heating time periods of mutually different durations can advantageously be kept ready as a result for mutually different ambient temperatures.

The detection device can preferably generate a heating time period, especially a heating time period duration as a function of an ambient temperature detected before contacting the object or select one from the memory.

The detection device may preferably generate the heating current separately. The detection device may have at least one separate power source for generating the heating current. As a result, the heating current can be advantageously sent by additionally connecting the separate power source.

In a preferred embodiment, the temperature sensor has a temperature-dependent ohmic resistance. The detection device is designed in this embodiment to send a measuring current and/or the heating current to the ohmic resistance and to detect a voltage, which drops over the temperature sensor and forms the temperature signal. The temperature sensor may be, for example, by an NTC resistor or a PTC resistor in this embodiment.

In another embodiment, the temperature sensor is an active temperature sensor, which has an input for a supply voltage and an output for sending the temperature signal. The detection device is designed in this embodiment to generate a supply voltage for operating the active temperature sensor and to increase the supply voltage for operating the active temperature sensor during the heating time period and thus to generate the heating current during the heating time period.

For example, such an active temperature sensor may be a digital temperature sensor, which can be operated with the supply voltage. The digital temperature sensor has an output for the temperature signal. The increase in the supply voltage advantageously brings about an increase in the electric power loss transformed in the temperature sensor, as a result of which the temperature sensor is heated.

The present invention also pertains to a temperature detection system with a temperature detection device of the above-described type. The temperature detection system has a temperature sensor, which is designed to be connected to the detection device.

The present invention also pertains to a process for detecting a temperature by means of a temperature sensor, in which a temperature sensor is supplied with a current during a detection time period for detecting a temperature. The temperature sensor is heated before the detection time period during a heating time period by means of a current that is increased relative to the current such that a heat transformed by the increased current in the temperature sensor is greater than during the detection time period.

The temperature sensor is preferably formed by a temperature-dependent resistor. In another embodiment, the temperature sensor is an active temperature sensor, which is supplied with a supply voltage and sends a temperature signal representing a detected temperature on the output side, the current being generated during the heating time period by increasing the supply voltage.

Advantageous forms of application for a detection system for detecting a temperature of a living being are an incubator, a fireman's helmet, a mask, especially a gas mask, a piece of sports equipment, especially fitness equipment, and a monitoring device for monitoring a medical procedure on a living being. The above-described temperature detection device, especially a detection system with a temperature detection device and with a temperature sensor, preferably with a double temperature sensor, may advantageously be part of the incubator, the fireman's helmet, the sports equipment, the device for monitoring the medical procedure or of the mask.

The present invention will be described below on the basis of figures and more exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENT

Figure 1:
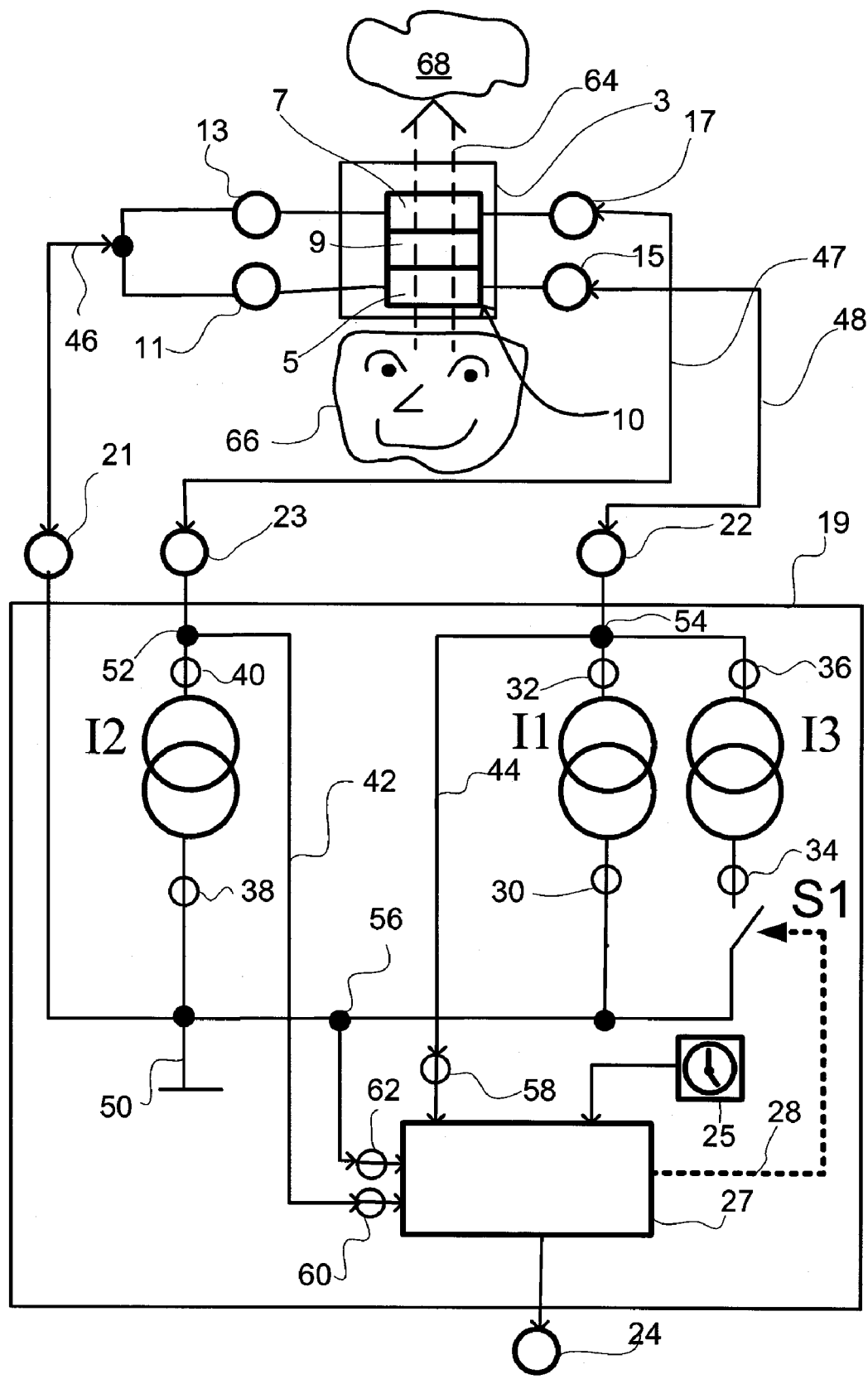
FIG. 1 is a schematic view showing an exemplary embodiment of a detection system for detecting a temperature of an object with a detection device and with a double temperature sensor.

Referring to the drawings in particular, FIG. 1 schematically shows an exemplary embodiment of a detection system 1 for detecting a temperature of an object, especially a human being. The detection system 1 has a double temperature sensor 3. The double temperature sensor 3 has a first temperature sensor 5, a second temperature sensor 7 and a heat transmission layer 9 with a predetermined heat transmission resistance, which is arranged between the first temperature sensor and the second temperature sensor. The first temperature sensor 5 has a ground terminal 11 and a temperature signal terminal 15. The second temperature sensor 7 has a ground terminal 13 and a temperature signal terminal 17.

The detection system 1 also has a control unit 19, which forms a detection device. The control unit 19 has a ground input 21, an input 23 for a second temperature signal and an input 22 for a first temperature signal. The control unit 19 has a power source I1, a power source I2 and a power source I3. The control unit 19 also has a regulator 27. The power source I1 has a ground terminal 30, the power source I2 has a ground terminal 38 and the power source I3 has a ground terminal 34. The power source I1 has an output 32, the power source I2 has an output 40 and the power source I3 has an output 36.

The control unit 19 has a ground terminal 50. The ground terminals 30 and 38 are connected to the ground terminal 50 via a connection node 56. The ground terminal 34 is separably connected to the ground terminal 50 via a switch S1 via the connection node 56. The power source I3 and the switch S1 are thus connected in series with one another. The regulator 27 is functionally connected to the switch S1 on the output side via a connection 28. The switch S1 can be actuated as a function of a control signal generated by the regulator 27. The switch S1 may be formed, for example, by a switching transistor. The input 21 of the control unit 19 is connected to the ground terminal 50. The input 23 of the control unit 19 is connected to the output 40 of the power source I2 via a connection node 52. The input 22 of the control unit 19 is connected to the output 32 of the power source I1 via a connection node 54. The output 36 of the power source I3 is connected to the connection node 54. The regulator 27 has an input 58 for a first temperature signal, which is connected to the connection node 54 via a connection line 44. The regulator 27 also has an input 60 for a second temperature signal, which is connected to the connection node 52 via a connection line 42.

The ground terminal 11 is connected to the ground terminal 13, which forms a common ground terminal of the double temperature sensor 3 in this exemplary embodiment. The ground terminal 13 is separably connected to the input 21 via a connection line 46. The temperature signal terminal 17 is separably connected to the input 23 via a connection line 47 and the temperature signal terminal 15 is separably connected to the input 22 via a connection line 48. The regulator 27 has a ground terminal 62. The ground terminal 62 is connected to the ground terminal 50 of the control unit 19 via the connection node 56. The regulator 27 is connected on the output side to an output 24 for a temperature signal representing a temperature of the living being. The regulator 27 is connected to a timer 25. The timer 25 can generate a time base and be formed, for example, by a crystal. The regulator 27 may be designed to generate the heating signal during a predetermined heating time period.

The mode of operation of the detection system 1 will be explained below:

The first temperature sensor 5 and the second temperature sensor 7 are designed as temperature-dependent resistors each. The heat transmission layer 9 has a predetermined heat transmission resistance. The first temperature sensor 5 has a contact surface 10. The contact surface 10 is designed for contacting a living being in a thermally conductive manner. A heat flux 64 may flow from the living being 66, via the contact surface 10, through the first temperature sensor 5, through the heat transmission layer 9 and the second temperature sensor 7 into an environment 68 after the contact surface 10 of the double temperature sensor 3 contacts the living being 66 in a thermally conductive manner in case the living being 66 has a higher temperature than an ambient temperature. A temperature difference is formed between the first temperature sensor 5 and the second temperature sensor 7 through the heat transmission layer 9, which forms a heat transmission resistance.

The power source I1 can send a current via the connection line 48 via the output 32 and the input 22 under the terminal 15 through the temperature sensor 5, and further via the terminal 11 and the input 21 to the ground terminal 50. Via the output 40, the connection node 52, the input 23, the connection line 47 and the terminal 17, the power source I2 can send a current through the temperature sensor 7 via the terminal 13, the connection line 46 and the input 21 to the ground terminal 50.

The regulator 27 is designed to detect a voltage that is present between the input 58 and the ground terminal 62 and represents a temperature signal of the first temperature sensor in this exemplary embodiment. The regulator 27 is also designed to detect a voltage that is present between the input 60 and the ground terminal 62 and represents a temperature signal of the second temperature sensor 7 in this exemplary embodiment. The regulator 27 is designed, furthermore, to generate a time change of a difference, formed from the temperature signal of the first temperature sensor 5 and the temperature signal of the second temperature sensor 7, and to generate a heating signal as a function of the difference and to send this heating signal on the output side via the connection line 28 for actuating the switch S1. The regulator 27 may be designed, furthermore, to generate the heating signal during a predetermined heating time period.

The switch S1 can close as a function of the heating signal and thus connect the power source I3 to the first temperature sensor 5 via the output 36 and the input 22, the connection line 48 and the terminal 15. This causes an additional current generated by the power source I3 to flow through a first temperature sensor 5. As a result, an additional thermal output, which heats the double temperature sensor 3, is formed in the first temperature sensor, which is formed by a temperature-dependent ohmic resistance in this exemplary embodiment.

The above-described change in the difference over time, which is detected by the regulator 27, can be formed, for example, when the contact surface 10 of the double temperature sensor 3 contacts the living being 66. The double temperature sensor 3 was in a thermal equilibrium before the contacting, so that the voltage dropping over the first temperature sensor 5 and the second temperature sensor 7 was unchanged over time, assuming a constant current flow through the temperature sensors. After contacting the living being 66, a sharp temperature increase develops over time at the first temperature sensor 5, which brings about a temperature difference between the first temperature sensor 5 and the second temperature sensor 7. The regulator 27 can detect in this manner the contact between the double temperature sensor 3 and the living being 66 and generate the heating signal as a function of the contact. The control unit 19 also has an output 24 for a temperature signal. The regulator 27 is designed to generate a temperature signal which represents a temperature of the living being 66 as a function of the first temperature signal and as a function of the second temperature signal, especially according to a predetermined assignment rule, and to make this signal available at the output 24.

Figure 2:
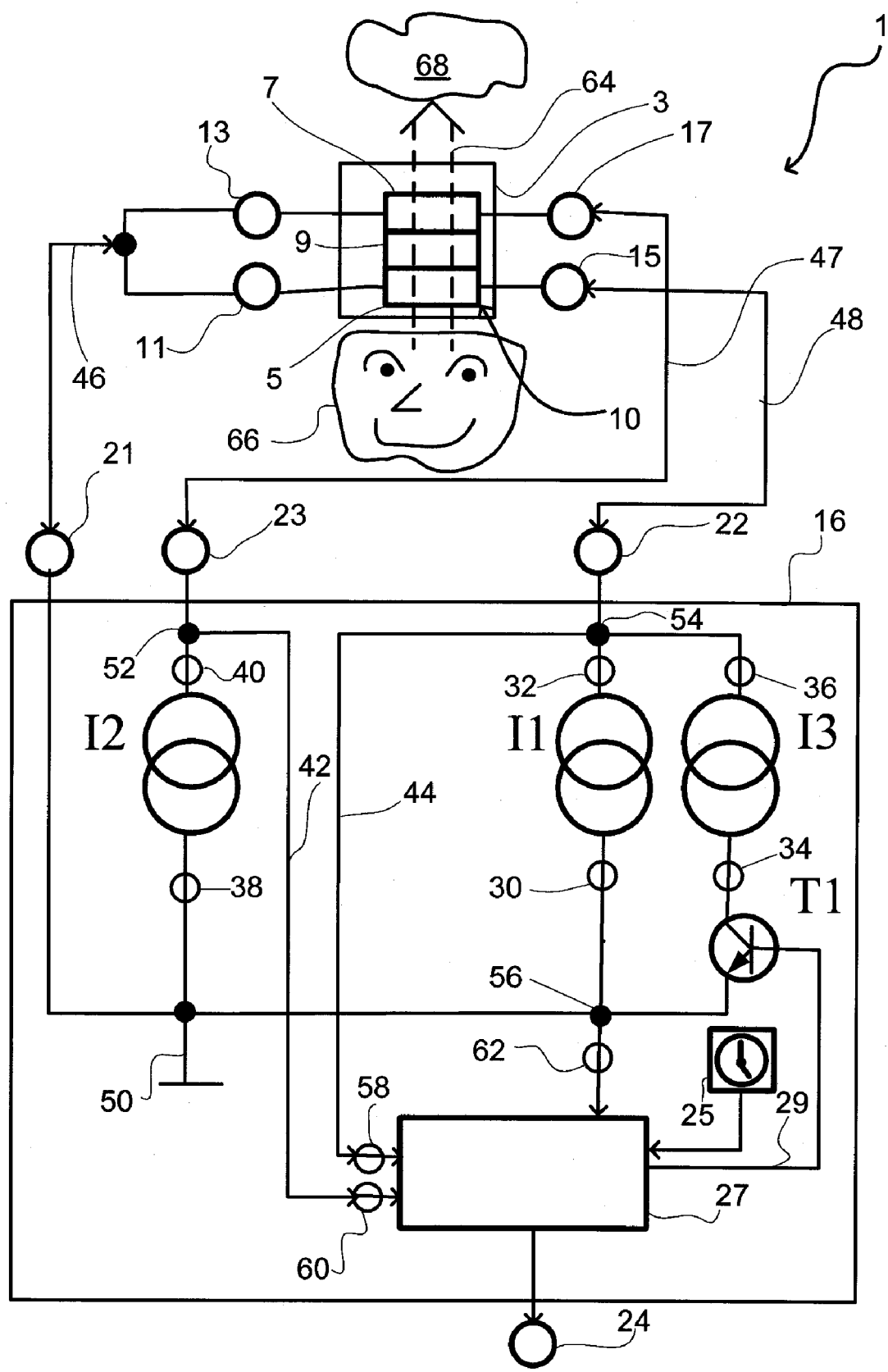
FIG. 2 is a schematic view showing a variant of the detection system shown in FIG. 1.

FIG. 2 shows an exemplary embodiment for a detection system 1, which has a design similar to that of the detection system shown in FIG. 1. The properties and the mode of operation of the detection system shown in FIG. 2 correspond to the components that are designated by the same reference numbers in FIG. 1. Unlike in FIG. 1, the detection system 1 has a control unit 16, which has a switching transistor T1 instead of the switch S1. A base terminal of the switching transistor T1 is connected to the output for the heating signal of the regulator 27 via a connection line 29. An emitter terminal of the transistor T1 is connected to the connection node 56, and a collector terminal of the transistor T1 is connected to the ground terminal 34 of the power source I3. The transistor T1 is designed to drive the emitter-collector section as a function of the heating signal and thus to send an additional heating current through the temperature sensor 5.

Figure 3:
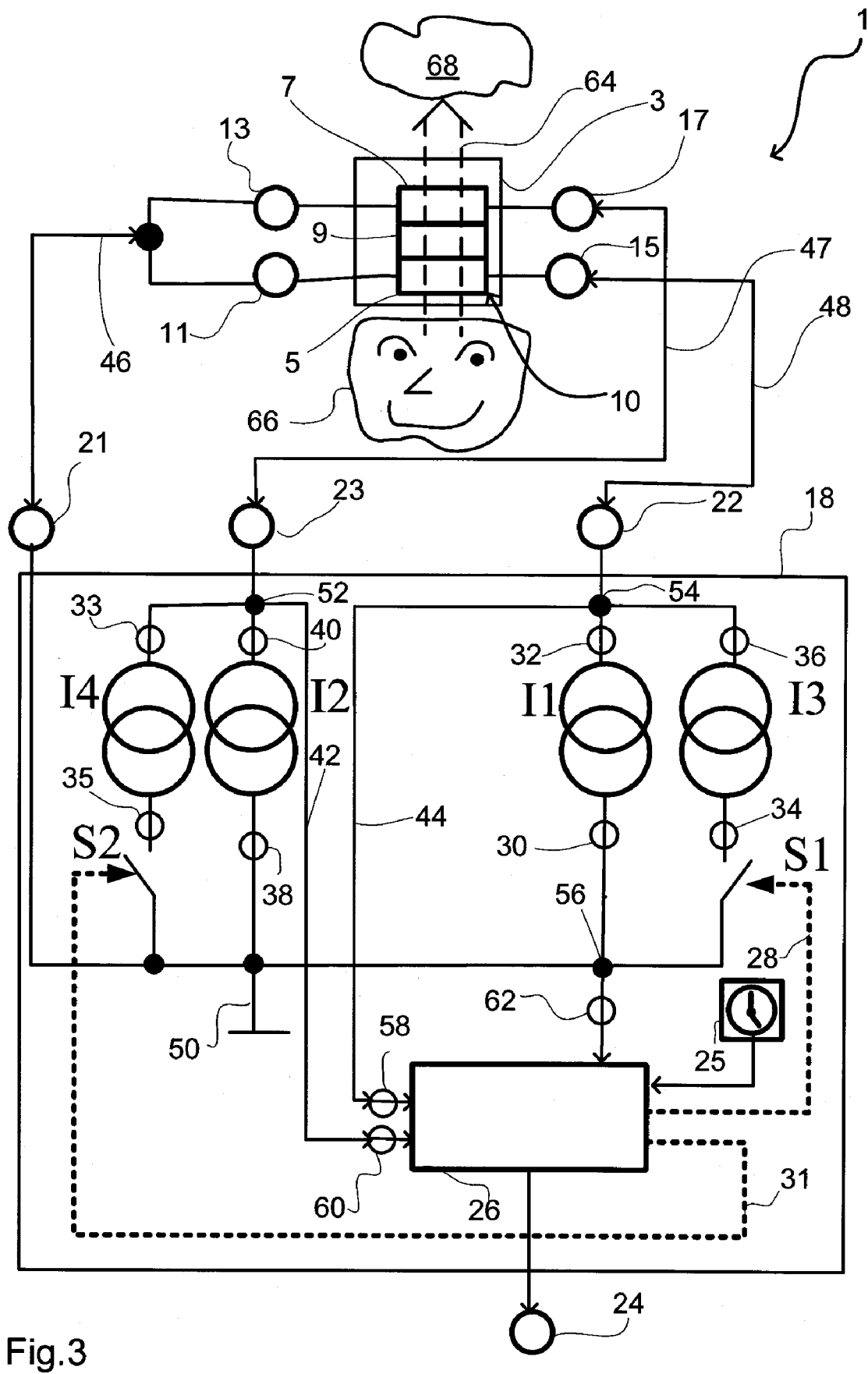
FIG. 3 is a schematic view showing a detection system for detecting a temperature of an object with a double temperature sensor comprising two temperature sensors, wherein the temperature sensors are activated for heating and for temperature detection.

FIG. 3 schematically shows an exemplary embodiment for a detection system 1 for detecting a temperature of a living being 66. The detection system 1 has a control unit 18, which forms a detection device and which has a design similar to that of the control unit 19 shown in FIG. 1. The control unit 18 has four power sources, namely, a power source I1, a power source I2, a power source I3 and a power source I4. The control unit 18 also has a regulator 26 with an input 60 for a second temperature signal and an input 62 for a first temperature signal and with a ground terminal 58. The regulator 26 also has an output for a heating signal, which output is functionally connected to a switch S1 via a connection line 28. Components shown in FIGS. 1 and 3 with the same reference numbers have the same property and the same function. The control unit 18 has an input 21, an input 23 and an input 22.

Unlike as shown in FIG. 1, the control unit 18 shown in FIG. 3 has a fourth power source I4. The regulator 26 is functionally connected on the output side to a switch S2 via a connection line 31. The power source I4 has a terminal 35 and an output 33. The terminal 35 of the power source I4 is separately connected to the ground terminal 50 of the control unit 18 via the switch S2, so that the power source I4 and the terminal 35 there is connected to the ground terminal 50 when the switch S2 is closed. The output 33 of the power source I4 is connected to the connection node 52 and thus to the input 23. The regulator 26 is designed corresponding to the regulator 27 shown in FIG. 1.

In addition to the already described properties of the regulator 27, the regulator 26 is designed to generate a heating signal as a function of a difference formed from the first temperature signal received at the input 62 and a second temperature signal received at the input 60 and to send this to the switch S2 via the connection line 31. The switch S2 is designed to be actuated as a function of the heating signal. The regulator 26 can thus heat up the first temperature sensor 5 by actuating the switch S1 and the second temperature sensor 7 by actuating the switch S2. For example, the regulator 26 may be designed to actuate the switches S1 and S2 alternatingly to one another by generating corresponding heating signals. Switch S1 and/or switch S2 may be designed as a switching transistor.

The regulators 26 and 27 shown in FIGS. 1, 2 and 3 may be each designed to alternatingly perform heating of the temperature sensor and detection of a temperature signal in a time-dependent manner. Regulator 26 and/or regulator 27 may be designed to make available the temperature signal at the output 24 when the switch S1 and the switching transistor T1 are opened, or in case of FIG. 3 when switch S1 and switch S2 are each opened. Only one temperature signal is generated in this manner when the power sources I1 and I2 intended for detecting the temperature or for measuring the temperature are activated.

Figure 4:
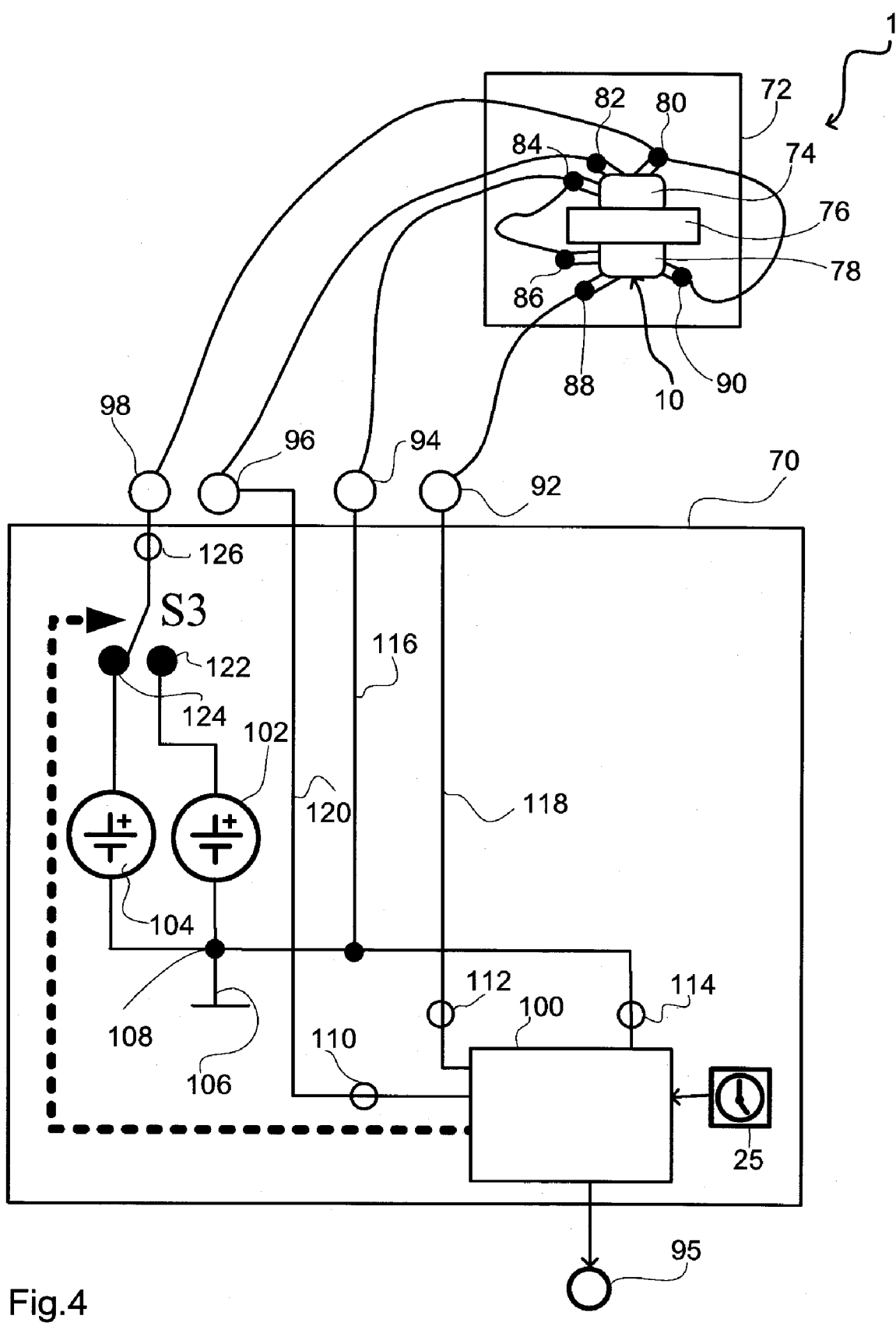
FIG. 4 is a schematic view showing a detection system for detecting a temperature of an object with an active temperature sensor.

FIG. 4 schematically shows an exemplary embodiment of a detection system 1 with a digital double temperature sensor 72. The digital double temperature sensor 72 has a first temperature sensor 78, a second temperature sensor 74 and a heat transmission layer 76 arranged between the first temperature sensor 78 and the second temperature sensor 74. The digital double temperature sensor 72 is designed to detect at least one temperature and to generate at least one digital temperature signal, which represents the detected temperature. The first temperature sensor 78 has a ground terminal 86 for this and the second temperature sensor 74 has a ground terminal 84 that is connected to the ground terminal 86. The first temperature sensor 78 has a terminal 90 for connecting the first temperature sensor to a supply voltage. The second temperature sensor 74 has a terminal 80 for connecting a supply voltage. The terminals 80 and 90 are connected to each other. The first temperature sensor 78 has a signal output 88 and the second temperature sensor 74 has a signal output 82. The first temperature sensor 78 is designed to generate a first digital temperature signal, which represents a detected first temperature, and to send this on the output side at the output 88.

The second temperature sensor is designed to generate a digital temperature signal, which represents a second detected temperature, and to send this signal on the output side at the output 82. The detection system 1 has a control unit 70. The control unit 70 has a ground terminal 94 for connecting the digital double temperature sensor 72. The control unit 70 also has an input 92 for a first digital temperature signal and an input 96 for a second digital temperature signal. The control unit 70 also has an output 98 for sending a supply voltage for the digital double temperature sensor 72. The output 98 is connected to a center contact 126 of a changeover switch S3. The changeover switch S3 has a fist switching contact 122 and a second switching contact 124 and is designed to connect the center contact 126 to the first switching contact 122 or to the second switching contact 124 as a function of a changeover signal.

The control unit 70 also has a regulator 100. The regulator 100 is functionally connected on the output side to the switch S3 via a connection line 116. The control unit 70 also has a power source 102 and a power source 104. The power sources 102 and 104 may be formed each by a battery, especially a rechargeable battery. The control unit 70 also has a ground terminal 106, which is connected to a connection node 108. A negative pole of the power source 102 is connected to the connection node 108 and a negative pole of the power source 104 is connected to the connection node 108. The regulator 100 has a ground terminal 114, which is connected to the ground terminal 106 via the connection node 108. The terminal 94 is connected to the ground terminal 106 via the connection node 108. The regulator 100 has an input 110 for the second temperature signal and an input 112 for the first temperature signal. The input 110 is connected to the input 96 of the control unit 70 via a connection line 120. The input 112 is connected to the input 92 of the control unit 70 via a connection line 118. The regulator 100 has a ground terminal 114 and is connected via this to the ground terminal 106. The regulator 100 is connected on the output side to a temperature signal output 95 and is designed to generate a temperature signal, especially according to a predetermined assignment rule, which represents a body temperature of a living being, and to send this on the output side at the output 95. The power source 102 and the power source 104 can generate supply voltages that are different from each other for supplying the digital double temperature sensor 72.

The ground terminals 84 and 86 of the digital double temperature sensor 72 are connected each to the terminal 94, especially separably. The output 88 of the digital double temperature sensor 72 is connected to the input 92, especially separably, and the output 82 of the digital double temperature sensor 72 is connected to the input 96, especially separably. Terminals 80 and 90 of the digital double temperature sensor 72 are connected each to the terminal 98 for obtaining a supply voltage, especially separably. The mode of operation of the detection system 1 will be described below.

The regulator 100 is designed to generate a heating signal for heating the double temperature sensor 72 and to send this signal to the changeover switch S3 via the connection line 116. The center contact 126 of the changeover switch S3 is connected to the switching contact 124 during a temperature detection operation or a temperature measurement operation. The digital double temperature sensor 72 can draw a supply voltage from the power source 104 in this switching state. For example, a voltage of the power source 104 is 3 V and a voltage of the power source 102 is 5 V. The changeover switch S3 can connect the center contact 126 with the switching contact 122 as a function of the heating signal. Terminal 98 is now connected to the power source 102. The digital double temperature sensor 72 then draws an operating voltage of 5V. This causes a power loss transformed in the digital double temperature sensor 72 to be increased compared to operation from the power source 104. The regulator 100 may be designed to generate the temperature signal only during the measurement or detection operation. The digital double temperature sensor 72 can then be connected to the power source 104 in this exemplary embodiment.

The temperature sensor 78 has a contact surface 10 intended for contacting a living being. The regulator 100 may be designed to generate the heating signal as a function of a change over time in the first and/or second temperature signal.

Figure 5:
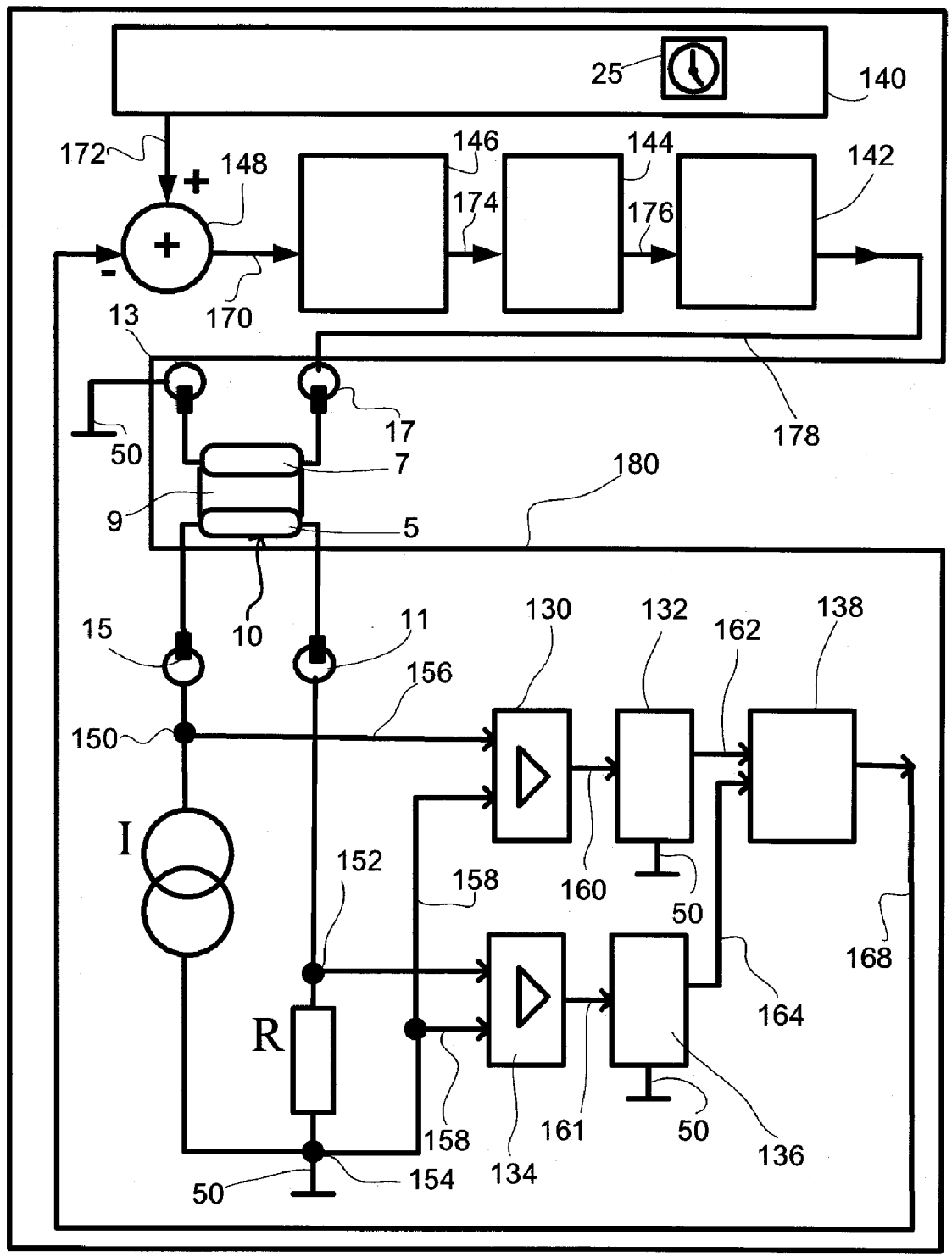
FIG. 5 is a schematic view showing an exemplary embodiment for a control unit for a temperature detection system.

FIG. 5 schematically shows an exemplary embodiment of a part of a detection system 1 shown in FIG. 1. A part of the regulator 19 in an embodiment variant 180 is shown. The control unit 180 has a measuring power source I, an amplifier 130, an amplifier 134, an A/D converter 132, an A/D converter 136, a calculating unit 138, a presetting unit 140 with a timer 25, a final control element 142, a pulse width modulator 144, a regulating member 146, an adding member 148, and a precision resistor R. A double temperature sensor 3, which was already described in FIG. 1, is connected to the control unit 180. The components of the double temperature sensor 3 from FIG. 1 and from FIG. 3 with the same reference number possess the same properties and function. The measuring power source I is connected to a terminal via a connection node 154 to a ground 50 of the control unit 180. A current output of the power source I is connected to a connection node 150. A temperature signal terminal 15 for connecting the temperature sensor 3 is connected to the connection node 150. The connection node 150 is also connected to a signal input of the amplifier 130 via a connection line 156.

Another input of the amplifier 130 is connected to the connection node 154 and hence to the ground terminal 50 via a connection line 158. A branch of the connection line 158 is also connected to an input of the amplifier 134. A signal input of the amplifier 134 is connected to a connection node 152. The connection node 152 is connected to the connection node 154 and hence to the ground terminal 50 via the precision resistor R. A ground terminal 11 for the double temperature sensor 3 is connected to the connection node 152. Amplifier 130 is connected to an A/D converter 132 on the output side via a connection line 160. The A/D converter is connected on the output side to a calculating unit 138 via a connection line 162. The amplifier 134 is connected on the output side to the A/D converter 136 via a connection line 161. The A/D converter 136 is connected on the output side to the calculating unit 138 via a connection line 164. The calculating unit 138 is connected on the output side to the adding member 148 via a connection line 168. The adding member 148 is connected on the input side to the presetting unit 140 via a connection line 172 and to the regulating member 146 on the output side via a connection line 170.

The regulating member 146 is connected on the output side to the pulse width modulator 144 via a connection line 174. The pulse width modulator 144 is connected on the output side to the final control element 142 via a connection line 176. The final control element 142 is connected on the output side to a terminal 17 of the double temperature sensor via a connection line 178 and is connected thereto a temperature signal terminal of the second temperature sensor 7. A ground terminal of the second temperature sensor 7 is connected to the ground terminal 50 of the control unit 180 via a terminal 13.

The mode of operation of the control unit 180 will be described below:

The measuring power source I can send a measuring current via the terminal 15 through a first temperature sensor 5 of the double temperature sensor 3. The measuring current flows via the measuring terminal 11 of the double temperature sensor 3 and via the connection node 152, and further via the precision resistor R to the ground terminal 50. A voltage, which can be detected via the connection node 152 by the amplifier 134, now drops over the precision resistor R. The amplifier 134 is designed to amplify the voltage detected on the input side and to send it on the output side to the A/D converter 136 via the connection line 161. The voltage detected by the amplifier 134 is proportional to a current generated by the power source I and flowing through the first temperature sensor 5. The amplifier 130 can detect a voltage dropping over the first temperature sensor 5 and send it to the A/D converter 132 via the connection line 160. The voltage detected by the amplifier 130 on the input side represents the temperature signal generated by the first temperature sensor 5. The first temperature sensor 5 has a contact surface 10 for contacting a living being. The calculating unit 138 is designed to generate a quotient of the digital signals received via the connection line 162 to that received via the connection line 164. The quotient corresponds to the ohmic resistance of the first temperature sensor 5. The calculating unit 138 may be designed, for example, as a microcontroller. The calculating unit 138 can generate a digital output signal representing the quotient and send this to the adding member 148 via the connection line 168. The quotient corresponds to a temperature detected by the first temperature sensor 5.

The generation of the quotient from a detected voltage and the current generated by the power source I has the advantage in this exemplary embodiment that a measuring current generated by the power source I does not have to be known. The measuring current generated by the power source I may also vary over time, and have, for example, an alternating current. By generating the quotient by the calculating unit 138, it is possible to detect a temperature especially accurately. The presetting unit 140 can send a preset value, especially a digital one, to the adding member 148 via the connection line 172. For example, the preset value can be generated during a predetermined heating time period. The adding member 148 can take the preset value received via the connection line 172 into account with a positive sign and take into account the quotient received via the connection line 178 with a negative sign, so that an addition result equals zero in case of agreement between the respective amounts. In case of agreement of the amounts, the adding member 148 can generate a difference value and send a corresponding signal to the regulating member 146 via the connection line 170. The regulating member 146 may be designed, for example, as a microcontroller. The regulating member 146 may be designed as a proportional integral regulator, or as a proportional integral differential regulator. The regulating member 146 can generate an output signal, which represents a manipulated variable, and send this signal to the pulse width modulator 144 via the connection line 174. The pulse width modulator 144 can generate a control signal, which has pulse time periods and pulse pause time periods. The control signal corresponds to the time average of the adjusting signal received on the input side. The pulse width modulator 144 can send the control signal thus generated to the final control element 142 via the connection line 176. The final control element 142 may have, for example, at least one transistor, for example, a field effect transistor. The final control element 142 also has a power source connected in series with a switching section of the transistor. The power source corresponds in this exemplary embodiment to the power source I3 in FIG. 1. A base terminal of the transistor is connected to the connection line 176. The final control element 142 can generate a heating current on the output side as a function of the control signal received on the input side and send this heating current on the output side via the connection line 178 to the terminal 17 and thus to the second temperature sensor 7. The second temperature sensor 7 can transform the heating current into heat and thus heat the double temperature sensor 3. Thus, the first temperature sensor 5 is used in this exemplary embodiment for detection and/or measurement and the second temperature sensor is used to heat the double temperature sensor 3. The second temperature sensor 7 can detect a temperature during a heating pause, which is formed, for example, by a pulse pause generated by the pulse width modulator. The mode of action of the double temperature sensor was already described in FIG. 1.

Figure 6:
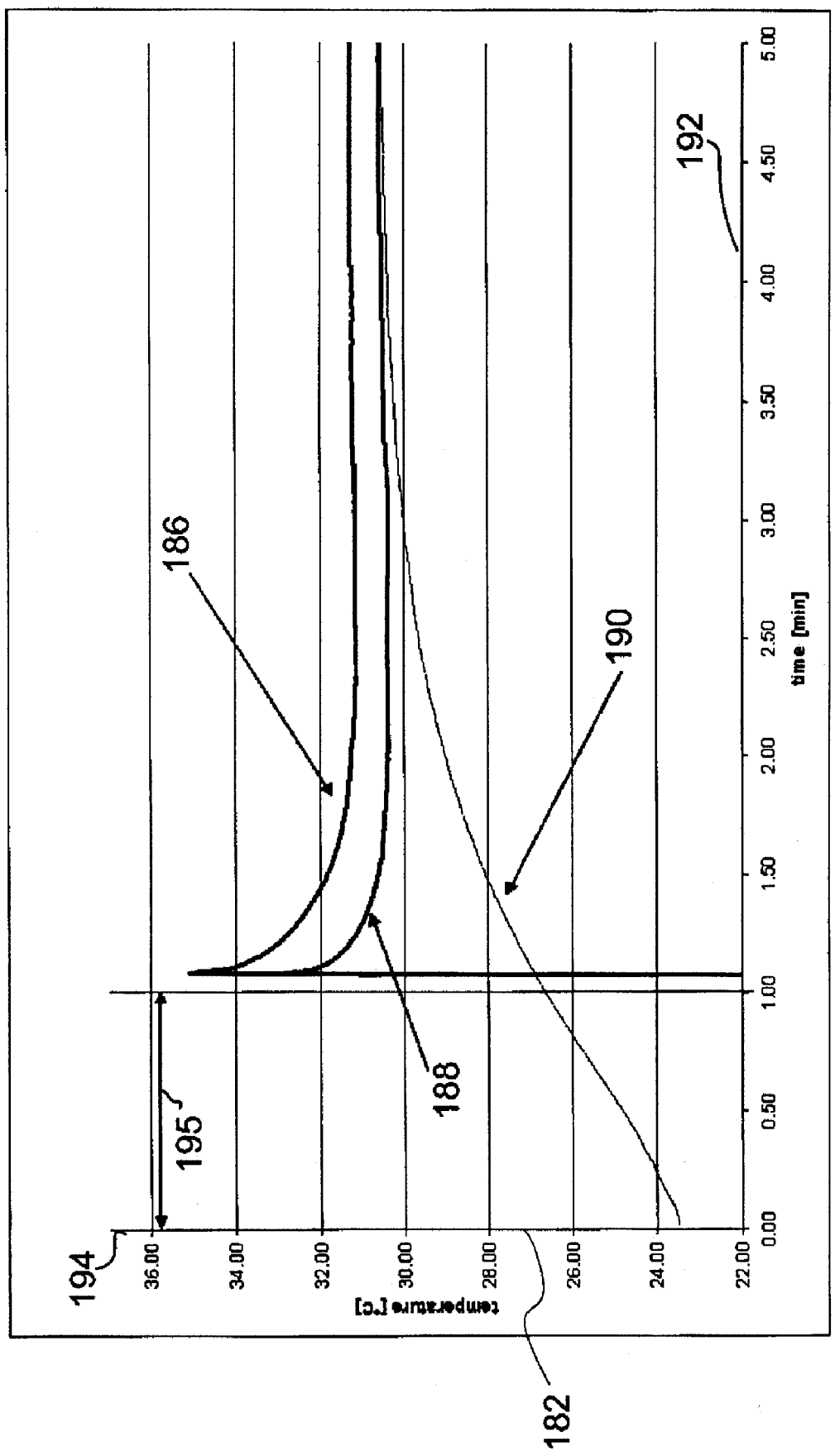
FIG. 6 is a schematic view showing a diagram with temperature-vs.-time curves of a temperature sensor.

FIG. 6 shows a diagram 182. Diagram 182 shows three curves 186, 188 and 190, which represent each a temperature curve of a detected temperature of a living being, detected by a double temperature sensor. A resistance of a temperature sensor may be, for example, 2,500 Ohm at 20° C. An abscissa 192 corresponds to a time in minutes, and an ordinate 194 corresponds to a temperature in ° C. An ambient temperature of the environment 68 shown in FIG. 1 equals 23° C. in this exemplary embodiment. The double temperature sensor is preheated during a heating period 195. The heating period 195 equals one minute in this exemplary embodiment. Curve 186 represents a temperature-vs.-time curve detected by the double temperature sensor after the end of the heating period 195. A heating current for heating the double temperature sensor equals 5 mA during the heating period 195. Curve 188 represents a temperature curve of the double temperature sensor, where a heating current for heating the double temperature sensor during the heating period 195 equals one mA. Curve 190 represents a temperature curve detected by the double temperature sensor, where the double temperature sensor was not preheated. A current for detecting the temperature equals 100 mA. It can be clearly recognized that the temperature curves represented by the curves 186 are saturated markedly more rapidly than the temperature curve shown by curve 190. Thus, the preheating of the double temperature sensor causes a temperature of a living being to be able to be detected more rapidly at a preset precision.

Figure 7:
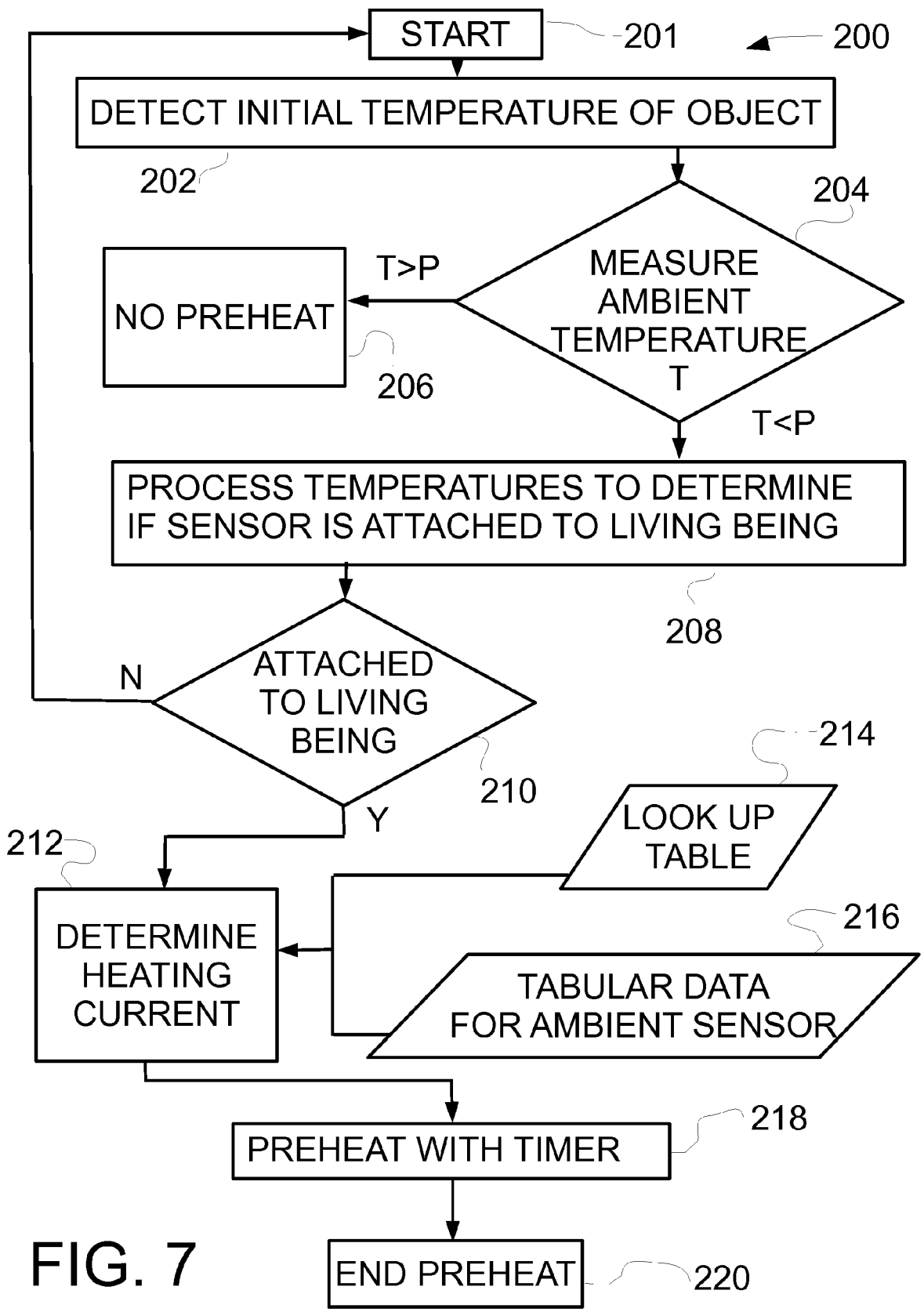
FIG. 7 is a schematic view showing a process for detecting a temperature of an object by means of a temperature sensor.

FIG. 7 shows an exemplary embodiment of a process 200 for detecting a temperature of a living being. Detection of a temperature of a living being by means of a temperature sensor, especially by means of a double temperature sensor, is started at a start step 201. A temperature is detected in step 202 by means of the temperature sensor. A temperature, which corresponds, for example, to an ambient temperature, is detected in another step 204. When the temperature is greater than a predetermined temperature value, for example, 37° C., the process is continued with a step 206. No preheating is necessary in step 206. A distinction can, furthermore, be made in step 204 whether a temperature of a first temperature sensor, which corresponds, for example, to a skin temperature, is greater than a predetermined temperature value or whether a temperature of a second temperature sensor is greater than a predetermined temperature. The first temperature sensor and the second temperature sensor may be part of a double temperature sensor, for example, of the double temperature sensor 3 shown in FIG. 1. When the temperature is lower in step 204 than the predetermined temperature value, the process can be continued in a process step 208. The contacting between the temperature sensor and a living being is detected in process step 208. This may happen, for example, by detecting a temperature gradient of a temperature detected by the temperature sensor, or by a resistance measurement of a resistor of the temperature sensor with pulsed current and by determining the cooling times during a pulse pause. Whether the temperature sensor has been in contact with the living being is detected in another step 210. If not, the process is continued with step 201. If the temperature sensor has been contacted with a living being, the process is continued with step 212.

An optimal heating current is determined in step 212. Data from a table, for example, a look-up table, are read for this in a step 214. The tabular data may represent coefficients for a heating characteristic of an ambient temperature sensor, especially of the second temperature sensor, and/or for the heating characteristic of a skin temperature sensor, especially of the first temperature sensor. The coefficients for the heating characteristic may represent a dependence on an ambient temperature, on a temperature difference between a skin temperature and an ambient temperature or on conditions of use, for example, the wearing of a helmet, a mask, etc. The above-mentioned tabular data can be read in a step 216 for an ambient temperature sensor, especially the second temperature sensor of the double temperature sensor. A current pulse frequency for operating a pulse width modulator can then be determined in process step 212. In another step 218, the temperature sensor can be preheated. For example, two mutually different timers may be started in step 218. The timers can generate a heating time period each, during which a temperature sensor shall be preheated. For example, a first timer can thus generate a heating time period for the ambient temperature sensor, and a second timer can generate a heating time period for the skin temperature sensor. Heating of the temperature sensors during the heating time period takes place in a subsequent step. The process can be continued with step 201 in a step 220 after the end of the first and/or second heating time period.

While specific embodiments of the invention have been shown and described in detail to illustrate the application of the principles of the invention, it will be understood that the invention may be embodied otherwise without departing from such principles.

What is claimed is:

1. A detection device for detecting a temperature of an object, the detection device comprising:
 a double temperature sensor, which comprises a first temperature sensor and a second temperature sensor and a heat transmission member with a predetermined heat transmission resistance, said heat transmission member being arranged between said first temperature sensor and said second temperature sensor, and said detection device determining the temperature of the object as a function of a first temperature signal generated by said first temperature sensor and as a function of a second temperature signal generated by said second temperature sensor;
 a detection current means for sending a detection current for detecting the temperature to said double temperature sensor and to receive at least one temperature signal, which represents a temperature of said double temperature sensor and to generate a temperature signal, which represents the temperature of the object, as a function of the temperature signal of said temperature sensor and to provide this temperature signal as an output;
 a heating current means for generating a heating current and for sending said heating current to said temperature sensor during a heating time period, so that a total current, comprising said detection current for detecting the temperature and said heating current, is greater than said detection current to heat said temperature sensor; and
 a detection control means for controlling said detection current means and said heating current means, said detection device selectively and separately sending said heating current to said first and said second temperature sensor to selectively and separately heat said first and said second temperature sensor.

2. A detection device in accordance with claim 1, wherein said detection control means detects a temperature rise over time, which is represented by the temperature signal, and sends said heating current to said temperature sensor as a function of the temperature rise.

3. A detection device in accordance with claim 1, wherein said detection control means receives a first temperature signal of said first temperature sensor and a second temperature signal of said second temperature sensor, and generates a difference between the first and second temperature signals, and selectively sends the heating current to said first and said second temperature sensor as a function of the difference.

4. A detection device in accordance with claim 1, wherein said temperature sensor has a temperature-dependent ohmic resistance; and
 said detection control means includes a control unit designed to send the detection current and/or the heating current to said ohmic resistance and to detect a voltage, which drops over said temperature sensor and forms the temperature signal.

5. A detection device in accordance with claim 1, wherein said temperature sensor is an active temperature sensor, which has an input for a supply voltage and an output for sending the temperature signal, said detection control means generating a supply voltage for operating said active temperature sensor and to increase the supply voltage for operating said active temperature sensor during said heating time period and thus to generate the heating current during said heating time period.

6. A detection device in accordance with claim 1, wherein said detection control means generates said heating current during a heating time period such that said heating time period comprises heating periods and heating pause periods.

7. A detection device in accordance with claim 6, wherein said detection control means detects and/or analyzes the temperature signal during a heating pause.

8. A detection system for detecting a temperature of a living being, the system comprising:
 a double temperature sensor comprising a first temperature sensor and a second temperature sensor and a heat transmission member with a predetermined heat transmission resistance, said heat transmission member being arranged between said first temperature sensor and said second temperature sensor, said temperature sensor being a double temperature sensor comprising a first temperature sensor and a second temperature sensor and a heat transmission member with a predetermined heat transmission resistance, said heat transmission member being arranged between said first temperature sensor and said second temperature sensor;
 a detection current means for sending a detection current for detecting the temperature to said double temperature sensor and to receive at least one temperature signal, which represents a temperature of said temperature sensor and to generate a temperature signal, which represents the temperature of the living being, as a function of the temperature signal of said temperature sensor and to provide this temperature signal as an output, said detection device determining the temperature of the living being as a function of a first temperature signal generated by said first temperature sensor and as a function of a second temperature signal generated by said second temperature sensor;
 a heating current means for generating a heating current and for sending said heating current to said temperature sensor during a heating time period, so that a total current, comprising said detection current for detecting the temperature and said heating current, is greater than said detection current to heat said temperature sensor; and
 a detection control means for controlling said detection current means and said heating current means, said temperature sensor being connected to said detection control means, said detection control means determining the temperature of the living being as a function of a first temperature signal generated by said first temperature sensor and as a function of a second temperature signal generated by said second temperature sensor and to selectively and separately send said heating current to said first and said second temperature sensor and to selectively and separately heat said first and said second temperature sensor.

9. A detection system in accordance with claim 8, wherein said detection control means detects a temperature rise over time, which is represented by the temperature signal, and sends said heating current to said temperature sensor as a function of the temperature rise.

10. A detection system in accordance with claim 8, wherein said detection control means receives a first temperature signal of a first temperature sensor and a second temperature signal of a second temperature sensor, and generates a difference between the first and second temperature signals, and selectively sends the heating current to said first and said second temperature sensor as a function of the difference.

11. A detection system in accordance with claim 8, wherein said detection control means generates said heating current during a heating time period such that said heating time period comprises heating periods and heating pause periods.

12. A detection system in accordance with claim 8, wherein said temperature sensor has a temperature-dependent ohmic resistance; and
said detection control means includes a control unit designed to send the detection current and/or the heating current to said ohmic resistance and to detect a voltage, which drops over said temperature sensor and forms the temperature signal.

13. A temperature detection system for detecting a temperature of an object, the system comprising:
a temperature sensor;
a detection device sending a detection current to said temperature sensor and receiving a temperature signal from said temperature sensor which represents a temperature of the object;
a heating current device generating a heating current, said heating current device sending said heating current to said temperature sensor during a heating time period in order to heat said temperature sensor, a total current comprising said detection current and said heating current being greater than said detection current; and
a control device controlling said detection current means and said heating current means, said control device being connected to said temperature sensor, said control device detecting a change in temperature in said temperature sensor which is not caused by said heating current, said control device starting the heating time period as a function of the change in temperature.

14. A temperature detection system in accordance with claim 13, wherein:
said temperature sensor includes a first thermometer and a second thermometer, said temperature sensor also includes a heat transmission member with a predetermined thermal conductivity, said heat transmission member being arranged between said first thermometer and said second thermometer;
said control device determining the temperature of the object as a function of a first temperature signal generated by said first thermometer, as a function of a second temperature signal generated by said second thermometer, and as a function of said predetermined thermal conductivity, said control device selectively controlling said heating current device to selectively and separately send said heating current to said first and said second thermometer to selectively and separately heat said first and said second thermometer.

15. A temperature detection system in accordance with claim 14, wherein:
said control device selectively controls said heating current device to selectively separately send the heating current to said first thermometer and said second thermometer based on a difference between the first temperature signal and the second temperature signal.

16. A temperature detection system in accordance with claim 14, wherein:
said control device determines the temperature of the object according to the formula:

$$T_0 = T_1 + K_s/K_g * (T_1 - T_2),$$

in which
$T_0$ = is the object temperature;
$T_1$ = is a temperature of said first thermometer in contact with the object;
$T_2$ = is a temperature of said second thermometer in contact with an environment;
$K_s$ = is said thermal conductivity of said heat transmission member;
$K_g$ = is a thermal conductivity of the object.

17. A temperature detection system in accordance with claim 16, wherein:
said control device selectively controls said heating current device to selectively and separately send the heating current to said first thermometer and said second thermometer based on a difference between the first temperature signal and the second temperature signal.

18. A detection device for detecting a temperature of an object, the detection device being connected to at least one temperature sensor, the detection device comprising:
a detection current means for sending a detection current for detecting the temperature to said temperature sensor and to receive at least one temperature signal, which represents a temperature of said temperature sensor and to generate a temperature signal, which represents the temperature of the object, as a function of the temperature signal of said temperature sensor and to provide this temperature signal as an output;
a heating current means for generating a heating current and for sending said heating current to said temperature sensor during a heating time period, so that a total current, comprising said detection current for detecting the temperature and said heating current, is greater than said detection current to heat said temperature sensor; and
a detection control means for controlling said detection current means and said heating current means, said detection control means receiving a first temperature signal of a first temperature sensor and a second temperature signal of a second temperature sensor, and generates a difference between the first and second temperature signals, and selectively sends the heating current to said first and said second temperature sensor as a function of the difference.

19. A detection system for detecting a temperature of a living being, the system comprising:
a temperature sensor;
a detection current means for sending a detection current for detecting the temperature to said temperature sensor and to receive at least one temperature signal, which represents a temperature of said temperature sensor and to generate a temperature signal, which represents the temperature of the living being, as a function of the temperature signal of said temperature sensor and to provide this temperature signal as an output;
a heating current means for generating a heating current and for sending said heating current to said temperature sensor during a heating time period, so that a total current, comprising said detection current for detecting the temperature and said heating current, is greater than said detection current to heat said temperature sensor; and
a detection control means for controlling said detection current means and said heating current means, said temperature sensor being connected to said detection control means, said detection control means receiving a first temperature signal of a first temperature sensor and a second temperature signal of a second temperature sensor, and generating a difference between the first and second temperature signals, and selectively sends the heating current to said first and said second temperature sensor as a function of the difference.

20. A temperature detection system for detecting a temperature of an object, the system comprising:
a temperature sensor including a first thermometer and a second thermometer, said temperature sensor also includes a heat transmission member with a predetermined thermal conductivity, said heat transmission member being arranged between said first thermometer and said second thermometer;

a detection device sending a detection current to said temperature sensor and receiving a temperature signal from said temperature sensor which represents a temperature of the object;

a heating current device generating a heating current, said heating current device sending said heating current to said temperature sensor during a heating time period in order to heat said temperature sensor, a total current comprising said detection current and said heating current being greater than said detection current; and a control device controlling said detection current means and said heating current means, said control device being connected to said temperature sensor, said control device determining the temperature of the object as a function of a first temperature signal generated by said first thermometer, as a function of a second temperature signal generated by said second thermometer, and as a function of said predetermined thermal conductivity, said control device selectively controlling said heating current device to selectively and separately send said heating current to said first and said second thermometer to selectively and separately heat said first and said second thermometer.

21. A temperature detection system for detecting a temperature of an object, the system comprising:

a temperature sensor including a first thermometer and a second thermometer, said temperature sensor also includes a heat transmission member with a predetermined thermal conductivity, said heat transmission member being arranged between said first thermometer and said second thermometer;

a detection device sending a detection current to said temperature sensor and receiving a temperature signal from said temperature sensor which represents a temperature of the object, said detection device sending the detection current to said temperature sensor and receiving the temperature signal from said temperature sensor during a detection period;

a heating current device generating a heating current, said heating current device sending said heating current to said temperature sensor during a heating time period in order to heat said temperature sensor, a total current comprising said detection current and said heating current being greater than said detection current; and a control device controlling said detection current means and said heating current means, said control device being connected to said temperature sensor, said control device determining during said detection period the temperature of the object as a function of a first temperature signal generated by said first thermometer, as a function of a second temperature signal generated by said second thermometer, and as a function of said predetermined thermal conductivity, said control device determines contact between the temperature sensor and a living being during said detection period from a difference between a temperature of said first and second thermometers, from a detected temperature gradient or from a cooling time.

* * * * *